May 24, 1966  V. W. PETERSON  3,252,553
CLUTCH AND COUPLING
Filed March 24, 1964  2 Sheets-Sheet 2
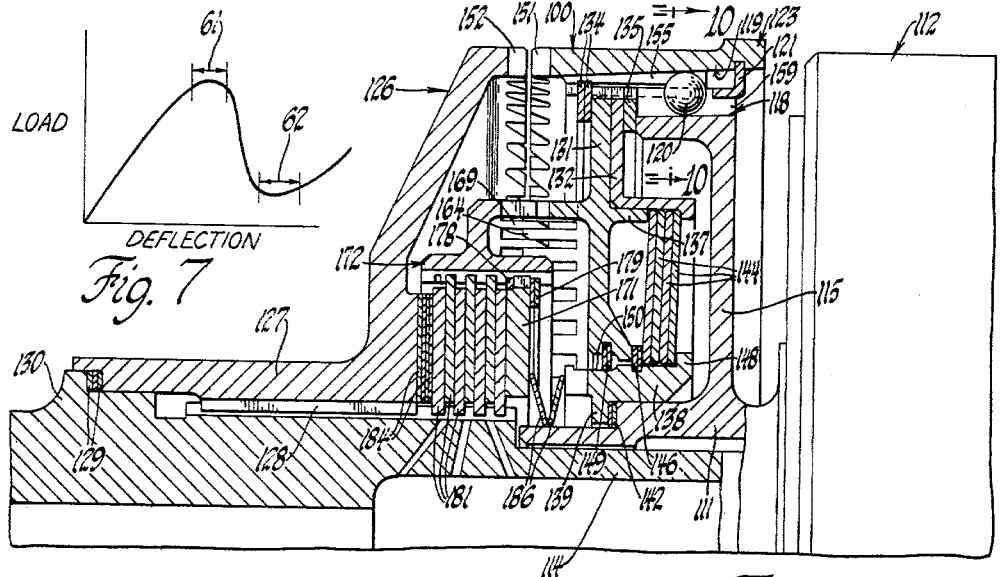
Fig. 7
Fig. 8
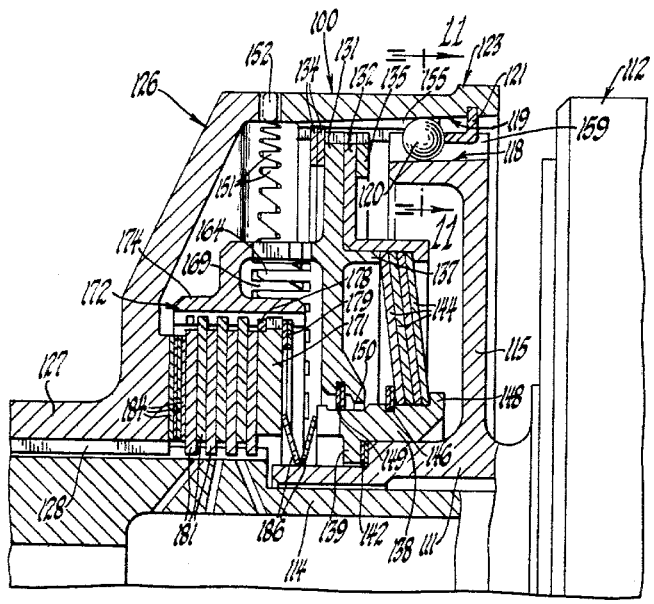
Fig. 9
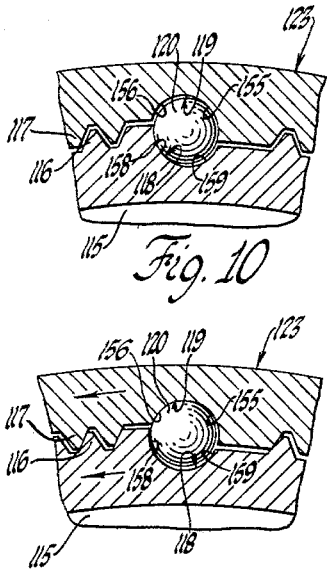
Fig. 10
Fig. 11
INVENTOR.
Victor W. Peterson
BY
A. M. Neiter
ATTORNEY

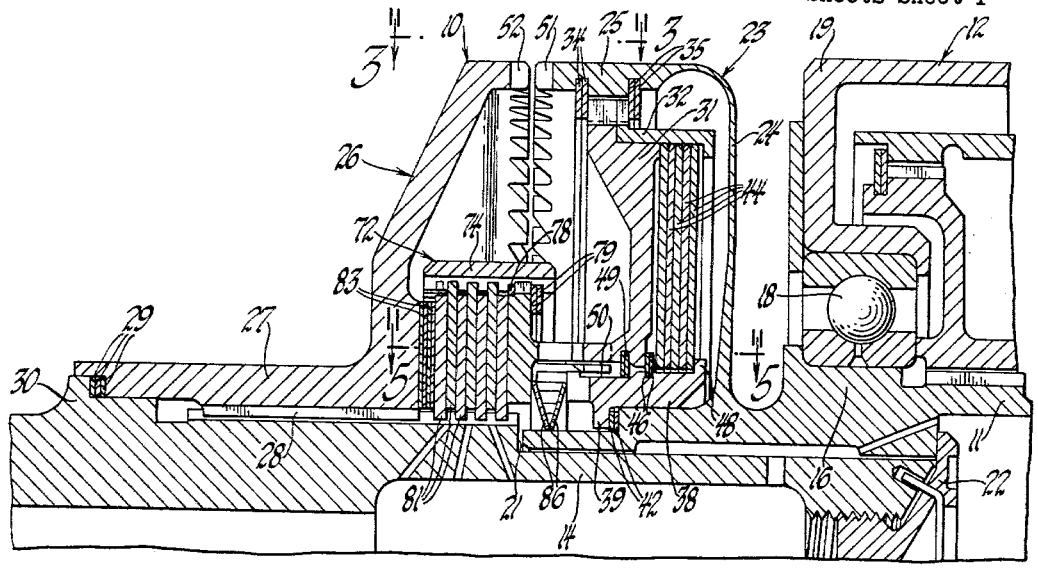

3,252,553
CLUTCH AND COUPLING
Victor W. Peterson, Indianapolis, Ind., assignor to General Motors Corporation, Detroit, Mich., a corporation of Delaware
Filed Mar. 24, 1964, Ser. No. 354,244
15 Claims. (Cl. 192—48)

This invention relates to couplings for connecting a driving member to a driven member and particularly to safety couplings for coupling a driving member to a driven member during normal torque transmitting conditions and automatically uncoupling the driving member from the driven member when detrimental torque loading conditions occur and recoupling the driving member to the driven member when normal torque transmitting conditions resume.

The safety coupling of this invention is for illustrative purposes adapted to couple a gas turbine engine to a variable pitch propeller and an engine starter and includes a driving coupling member fixed for rotation with the engine shaft and a driven coupling member fixed for rotation with a driven shaft which is adapted to be drivingly connected to the propeller and engine starter. The driving coupling member is capable of limited axial movement relative to the driven coupling member and for that purpose the driving coupling member in one embodiment has an outer rim joined to the engine shaft by a resilient web which will bend in response to certain axial forces acting on the outer rim. In another embodiment, the driving coupling member has a straight spline connection to the engine shaft for transmitting torque during normal operation and a ball spline connection to the engine shaft to permit axial movement and provide the drive connection during reverse torque loading of a certain magnitude. The driving coupling member and the driven coupling member have stepped coupling teeth which are engaged when the driving coupling member is in an engaged position and provide a torque path between the coupling members for transmitting torque from the engine shaft to the driven shaft. Coupling springs of the Belleville type, which are prestressed, yieldingly hold the driving coupling member in the engaged position with a relatively large coupling spring load and are deflectable to permit movement of the driving coupling member through either the bending web or the ball spline connection to a disengaged position corresponding to disengagement of the stepped coupling teeth. The load-deflection characteristics of the coupling springs are such that the coupling spring load urging the return of the driving coupling member from the disengaged position to the engaged position decreases with increasing spring deflection as the driving coupling member is moved from the engaged position to the disengaged position and is relatively small when the driving coupling member is in the disengaged position.

In the driving coupling member engaged position, the engaged steps of the stepped coupling teeth transmit the torque during normal operation and ramps on the stepped coupling teeth are held in engagement by the large spring load of the coupling springs. The ramps have a ramp angle selected so that the stepped coupling teeth respond to a predetermined reverse or negative torque, which is in excess of the starting torque of the engine starter, to provide a parting force which exceeds the large coupling spring load to part the stepped coupling teeth and urge the driving coupling member from its engaged position towards its disengaged position. Rigidly secured to the driving coupling member is a coupling control member having a stepped tooth connection to the clutch apply means of a coupling control clutch. The clutch is continuously engaged by clutch springs which are prestressed and act on the clutch apply means to provide a relatively small clutch apply load to clutch the coupling control member to the driven shaft and connected driven coupling member. The stepped teeth connecting the coupling control member to the clutch apply means remain engaged so that the coupling control member is never completely disengaged from the clutch apply means as the driving coupling member is urged to the disengaged position. As the driving coupling member is urged towards the disengaged position as a result of an occurrence of the predetermined reverse torque and the stepped coupling teeth part, the coupling control member is moved conjointly therewith until the angled ramps of its teeth are brought into engagement with the bases of the angled ramps of the clutch apply means' teeth which have been brought into this position of engagement by the slipping action of the clutch which is limited at this time since the stepped coupling teeth are not yet parted. As the coupling control member's teeth begin to climb the ramps of the clutch apply means' teeth as the result of the dynamic inertia torque of the clutch apply means, the driving coupling member is urged further towards the disengaged position by the engaged angled ramps of the stepped tooth connection, and the stepped coupling teeth are completely parted. Subsequent movement of the coupling control member's teeth up the ramps of the clutch apply means' teeth by the slipping action of the clutch, which is now conditioned for maximum slip since the stepped coupling teeth are completely parted, brings stops provided on the coupling control member's teeth into engagement with the clutch apply means' teeth and results in movement of the driving coupling member fully into the disengaged position. The ramp angle of the ramps of the coupling control member's teeth and clutch apply means' teeth is selected so that when the driving coupling member's speed approaches the driven coupling member's speed or conversely when the driven coupling member's speed approaches the driving coupling member's speed, and the dynamic inertia torque of the clutch apply means is relieved, the small spring load of the coupling springs becomes effective to urge the coupling control member's teeth to climb back down the ramps of the clutch apply means' teeth and move the driving coupling member towards its engaged position. As the coupling control member's teeth begin to climb off of the ramps of the clutch apply means' teeth, the stepped coupling teeth then start to engage. When the coupling control member's teeth have completely climbed off of the ramps of the clutch apply means' teeth the coupling control member is then conditioned to permit return of the driving coupling member to its engaged position resulting in full reengagement of the stepped coupling teeth whereby the steps and the ramps of the stepped coupling teeth are again held in engagement by the large spring load of the coupling springs. In this manner the coupling control member by its stepped tooth connection to the clutch controls the reengagement of the stepped coupling teeth and permits their reengagement only when the speeds of the driving coupling member and the driven coupling member are synchronized to prevent the stepped coupling teeth from ratcheting during reengagement and thus provide smooth reengagement.

It is an object of this invention to provide an improved safety coupling.

It is another object of this invention to provide a safety coupling operable during normal torque transmitting conditions to provide a torque path for torque transmittal and automatically uncoupling to interrupt the torque path when detrimental torque loading conditions occur and smoothly recoupling when normal torque transmitting conditions resume.

It is another object of this invention to provide a safety coupling having coupling teeth normally engaged providing a torque path for torque transmittal, and automatically disengaging in response to a predetermined reverse torque to interrupt the torque path and upon the alleviation of the reverse torque providing smooth coupling tooth engagement without ratcheting.

It is another object of this invention to provide a safety coupling for use in coupling a prime mover to a load including coupling members having coupling teeth normally engaged by a relatively large spring load to provide a torque path for torque transmittal and being responsive to a predetermined reverse torque tending to cause a speed differential between the load and the prime mover to disengage with one of the coupling members being moved by control means to a disengaged position where the spring load urging reengagement is relatively small, and the control means being operable to hold the one coupling member in the disengaged position and permitting the relatively large spring load to reengage the coupling teeth subsequent to synchronization of the speeds of the coupling members.

In the drawings:

FIGURE 1 is a longitudinal sectional view showing one embodiment of the invention with the coupling member's stepped teeth completely parted.

FIGURE 2 is the same view as shown in FIGURE 1 with the coupling member's stepped teeth fully engaged.

FIGURE 3 is a view taken on the line 3—3 in FIGURE 1.

FIGURE 4 is a view taken on the line 4—4 in FIGURE 2.

FIGURE 5 is a view taken on the line 5—5 in FIGURE 1.

FIGURE 6 is a view taken on the line 6—6 in FIGURE 2.

FIGURE 7 is a graph showing the load-deflection characteristics of the coupling springs.

FIGURE 8 is a longitudinal sectional view showing another embodiment of the invention with the coupling member's stepped teeth completely parted.

FIGURE 9 is the same view as shown in FIGURE 8 with the coupling member's stepped teeth fully engaged.

FIGURE 10 is a view taken on the line 10—10 in FIGURE 8.

FIGURE 11 is a view taken on the line 11—11 in FIGURE 9.

Referring now to the embodiment shown in FIGURE 1, a safety coupling generally designated at 10 is operable to couple an engine shaft 11 of a gas turbine engine 12 to a driven shaft 14 which is adapted to be connected to a variable pitch propeller and an engine starter, not shown. The engine shaft 11 which is the driving shaft has a hub 16 mounted by an antifriction bearing 18 in the engine housing 19. The shafts 11 and 14 are coaxial and the right-hand end of shaft 14 has a reduced diameter freely received and rotatably supported in a bore in the left-hand end of shaft 11. The step 21 provided by the reduced diameter end of shaft 14 and a retaining member 22 threadably secured to the right-hand end of shaft 14 limit relative axial movement between the shafts.

Located leftward of hub 16 is an annular driving coupling member 23 integral with shaft 11. The driving coupling member 23 has a resilient web 24 extending radially outward from the shaft 11 which makes a leftward bend of approximately ninety degrees at its outer extremity to join with the annular rim 25 of this coupling member and this web permits limited axial movement of the rim 25 as will be explained in detail later. An annular driven coupling member 26 opposite coupling member 23 has its hub 27 splined at 28 to the shaft 14. The driven coupling member 26 is prevented from further axial movement to the left relative to shaft 14 by shims 29 located between the flat end face of a collar 30 on shaft 14 and the step of a counterbore in the hub 27.

The outer perimeters of an annular coupling control member 31 and an annular spring retainer member 32 are splined to the interior of rim 25 and located between retainer rings 34 and 35 which are mounted in internal annular grooves in the rim 25 whereby the coupling control member 31 and the spring retainer member 32 are fixed for rotation with the driving coupling member 23 and prevented from axial movement relative to rim 25.

Mounted on the left-hand end of shaft 11 and internal of the driving coupling member 23 is an annular spring support member 38 which has an inwardly projecting collar 39 spaced axially from the step of the reduced diameter end of shaft 11 by shims 42 which prevent further rightward axial movement of support member 38 relative to shaft 11. A plurality of prestressed Belleville type diaphragm springs 44 is mounted on support member 38 with the springs located at their inner radius between retaining rings 46 mounted in an external annular groove in support member 38 and a collar 48 of support member 38. The springs 44, which serve as coupling springs, at their outer radius are located between the coupling control member 31 and the spring retainer member 32 and are prestressed to urge coupling control member 31 and connected rim 25 to the left relative to the support member 38 and shaft 11. Retaining rings 49 mounted in an internal annular groove in coupling control member 31 are slidable in an external annular groove 50 in support member 38 and retain the coupling control member 31 on the support member 38 during assembly.

The coupling members 23 and 26 have corresponding stepped buttress type coupling teeth 51 and 52 having corresponding ramps 53 and 54 and steps 56 and 57 respectively. Coupling teeth 51 are integral with rim 25 and the axial movement of rim 25 permitted by the bending of web 24 allows the coupling springs 44 acting on the coupling control member 31 and connected rim 25 to urge the rim 25 to an engaged position and the coupling teeth 51 into full engagement with the coupling teeth 52 as best shown in FIGURES 2 and 4. The web 24 also allows movement of rim 25 to a disengaged position as best shown in FIGURES 1 and 3 corresponding to disengagement of the coupling teeth 51 from the coupling teeth 52 against the spring load of coupling springs 44 when a predetermined reverse or negative torque occurs as will be explained subsequently in greater detail.

Referring to FIGURE 7, there is shown the load-deflection characteristics of the coupling springs 44. The coupling springs 44 are prestressed such that the spring load holding the rim 25 in the engaged position and the coupling teeth 51 and 52 in engagement falls within the high spring load range generally designated at 61 and when deflected upon movement of the rim 25 towards the disengaged position decreases in spring load to provide a spring load which falls within the low spring load range generally designated at 62 when the rim 25 is in the disengaged position. Under normal torque transmitting conditions, the ramps 53 and 54 are yieldingly held in engagement by the coupling springs 44 by the large spring load of the coupling springs 44 and the steps 56 and 57 engage to provide a torque path between the shaft 11 and shaft 14. The coupling members 23 and 26 rotate in the direction of the arrows as shown in FIGURE 4 with the length of these arrows representing the relative speeds of these members.

At the base of coupling control member 31, there are provided circumferentially spaced and axially extending stepped teeth 64 having ramps 66 and stops 68 at the bases of the ramps 66, as best shown in FIGURES 5 and 6. The teeth 64 which are integral with the coupling control member 31 mesh with the teeth 69 of an annular clutch pressure plate 71 of a clutch generally designated at 72 with the teeth 69 having ramped end faces 73 whose ramp angle is equal to the ramp angle of the ramps 66 of the coupling control member's teeth 64. The clutch pressure plate 71 by this stepped teeth connection is fixed for rotation with the coupling control member 31 and connected driving coupling member 23 and never becomes completely disengaged therefrom. When the coupling teeth 51 and 52 are fully engaged, the teeth 64 and 69 are normally engaged as shown in FIGURE 6. The clutch pressure plate 71 is clutched to the shaft 14 and connected driven coupling member 26 and for that purpose is splined to the interior of drum 74 of the clutch 72 with retaining rings 78 and 79 mounted in spaced internal annular grooves in drum 74 preventing axial movement of the pressure plate 71 relative to drum 74. The clutch 72 has a plurality of clutch plates 81 with alternate plates splined at their inner radius to the shaft 14, intermediate plates splined at their outer radius to the drum 74 and backing plates 83 suitably fixed to the driven coupling member 26. A pair of prestressed Belleville type diaphragm springs 86 arranged back-to-back engages the pressure plate 71 and the lefthand end face of support member 38 to urge these members apart and to yieldingly hold the clutch plates in constant engagement under a relatively small spring load.

Describing now the operation, the safety coupling 10 when in the normal torque transmitting drive condition as shown in FIGURE 2 transmits torque from the shaft 11 to the shaft 14 by the engagement of the coupling teeth 51 and 52 which are yieldingly held in engagement by the coupling springs 44 which have been prestressed to provide a spring load falling within the high spring load range 61 to yieldingly hold the rim 25 in its engaged position. In this engaged position, the steps 56 and 57 are in engagement for torque transmittal and the ramps 53 and 54 of the coupling teeth 51 and 52 are yieldingly held in engagement by the high spring load. There is no slip in the clutch 72 under these conditions and the teeth 64 and 69 are engaged as shown in FIGURE 6. Under these conditions, the driving coupling member 23 and the driven coupling member 26 rotate in the direction of the arrows shown in FIGURE 4 and at the same speed as represented by the lengths of these arrows.

The ramp angle of ramps 53 and 54 of coupling teeth 51 and 52 respectively is selected so that upon the occurrence of a predetermined reverse torque, the coupling members 23 and 26 are urged apart by the resulting force inteaction of the ramps 53 and 54 which exceeds the high spring load of coupling springs 44 and is effective to cause bending of the web 24 and axial movement of rim 25 to the right. This deflection of web 24 which has a low spring load as compared with the spring loads of the coupling springs 44 deflects the coupling springs 44 along the curve shown in FIGURE 7 and moves the coupling control member 31 rightwardly conjointly with the rim 25. As the rim 25 of driving coupling member 23 is urged towards its disengaged position as a result of the predetermined reverse torque and the coupling teeth 51 and 52 part by the sliding action of their ramps 53 and 54 which results in initial relative rotation between coupling members 23 and 26, the coupling control member 31 is moved until the ramps 66 of its teeth 64 are brought into initial engagement with the bases of the ramped end faces 73 of teeth 69 which have been brought into this position of engagement by the slipping action of the clutch 72 which under these conditions is limited since the coupling teeth 51 and 52 are not yet completely parted. As the coupling control member's teeth 64 initially begin to climb the ramped end faces 73 of the teeth 69 by the action of the clutch 72, the rim 25 is urged towards the disengaged position by the resulting force interaction of the ramps 66 and ramped end faces 73 and the coupling teeth 51 and 52 are completely parted as shown in FIGURE 3 to fully uncouple the driving coupling member 23 from the driven coupling member 26. Subsequent movement of the coupling control member's teeth 64 up the ramped end faces 73 by the slipping action of the clutch 72, which is now conditioned for maximum slip since the coupling teeth 51 and 52 are completely parted, brings stops 68 into engagement with the teeth 69 and movement of the rim 25 into its disengaged position. Under these conditions the coupling members 23 and 26 can rotate relative to each other as shown in FIGURE 3 by the lengths of the arrows with slipping action occurring in the clutch 72.

In the disengaged position of rim 25, the coupling springs 44 are deflected so that the spring load falls within the low spring load range 62. The ramp angle of the ramps 66 and ramped end faces 73 of the teeth 64 and 69 respectively is selected so that only when the shaft 11 approaches the speed of shaft 14 or conversely, the speed of shaft 14 approaches the speed of shaft 11 and the dynamic inertia torque acting on the pressure plate 71 is relieved, the small spring load of the coupling springs 44 is effective to urge teeth 64 to return down the ramped end faces 73. As the ramps 66 begin to leave the ramped end faces 73, leftward movement of rim 25 starts reengagement of the coupling teeth 51 and 52. When the teeth 64 have completely climbed off the ramped end faces 73, the coupling control member 31 then permits return of the rim 25 to its engaged position by the spring load of coupling springs 44 whereby the coupling teeth 51 and 52 are again held in engagement by the large spring load. In this manner the coupling control member 31 controls the reengagement of the coupling teeth 51 and 52 and permits their reengagement only when the speeds of the coupling members 23 and 26 are synchronized to prevent ratcheting which if permitted to occur would result in damage to the coupling teeth 51 and 52.

To insure that the coupling member's teeth 51 and 52 fully reengage, particularly in the event the coupling 10 is disengaged at shutdown, there is provided a predetermined backlash in the spline connection 28 connecting the driven coupling member 26 to the shaft 14. The backlash permits limited relative rotation between the driven coupling member 26 and shaft 14 and thus between the teeth 64 and 69 and between the coupling teeth 51 and 52 whereby reengagement by the coupling springs 44 is insured.

The selection of the high spring load of coupling springs 44 is such that the normal starter torque on the shaft 14 during engine starting does not exceed the high spring load and thereby prevents uncoupling during starting operation.

Referring now to the embodiment shown in FIGURES 8 and 9, the safety coupling generally designated at 100 is operable to couple the engine shaft 111 of the engine 112 to the shaft 114. Integral with shaft 111 is a radially extending hub 115 having at its outer perimeter circumferentially spaced straight male splines 116 in mesh with corresponding female splines 117 integral with and internal of the annular driving coupling member 123. At equally spaced locations about the outer perimeter of hub 115 and the inner perimeter of driving coupling member 123, there are provided in place of splines corresponding straight ball grooves 118 and 119 respectively. Mounted in each set of mating grooves 118 and 119 which provide ball races is a ball 120 to provide a straight ball spline connection between the hub 115 and the driving coupling member 123. A retainer collar 121 secured to driving coupling member 123 retains the balls in their respective ball races.

Opposite the driving coupling member 123 is an annular driven coupling member 126 having its hub 127 splined at 128 to the shaft 114. The driven coupling member 126 is prevented from further movement to the left relative to shaft 114 by shims 129 located between the end face of a collar 130 on shaft 114 and a step of a counterbore in the hub 127.

An annular coupling control member 131 and an annular spring retainer member 132 are splined at their outer perimeters to the driving coupling member 123 and located between retainer rings 134 and 135 mounted in internal annular grooves in the driving coupling member 123 to prevent relative axial movement whereby the coupling control member 131 and spring retainer member 132 are fixed for rotation with the driving coupling member 123 and are prevented from relative axial movement thereto. Internal of the driving coupling member 123 is an annular support member 138 mounted on the left-hand end of shaft 111. The support member 138 is prevented from further movement to the right relative to the shaft 111 by an integral collar 139 which is spaced from the step of the reduced diameter end of the shaft 111 by shims 142. A plurality of prestressed Belleville type diaphragm springs 144 is mounted on the support 138 and the springs at their inner radius are located between retainer rings 146 mounted in an external annular groove in support member 138 and a collar 148 of support member 138. The springs 144, which act as coupling springs, at their outer radius are retained between an annular axial extension 137 of the coupling control member 131 and the spring retainer member 132. Retaining rings 149 mounted in an internal annular groove in coupling control member 131 are slidable in an external annular groove 150 in support member 138 and retain the coupling control member 131 on the support member 138 during assembly.

The coupling members 123 and 126 have coupling teeth 151 and 152 respectively having the same configurations as the coupling teeth 51 and 52 respectively shown in FIGURES 3 and 4. In normal torque transmitting condition operation as shown in FIGURE 9, the coupling teeth 151 and 152 are held in engagement by the high spring load of the coupling springs 144 which have load-deflection characteristics the same as that shown in FIGURE 7.

The coupling control member 131 has stepped teeth 164 meshing with teeth 169 of a drum 174 of a clutch which is generally designated at 172. The teeth 164 and 169 have the same configurations as the teeth 64 and 69 respectively shown in FIGURES 5 and 6. Splined to the interior of drum 174 is an annular clutch pressure plate 171 which is prevented from axial movement relative to drum 174 by retaining rings 178 and 179. Clutch plates 181 which are engaged by leftward movement of the drum 174 and clutch pressure plate 171 have alternate plates splined at their inner radius to the shaft 114 and intermediate plates splined at their outer radius to the drum 174 and there are included backing plates 184 fixed for rotation with the driven coupling member 126. A pair of prestressed Belleville type diaphragm springs 186 arranged back-to-back engages the clutch pressure plate 171 and support member 138 to yieldingly hold the clutch plates in constant engagement under a relatively small spring load.

The grooves 118 and 119 mounting the balls 120 are inclined to the axis of the driving coupling member 123 and hub 115. The grooves 118 have a groove depth which decreases with increasing groove length in the rightward axial direction and the grooves 119 have a groove depth which increases with increasing groove length in the rightward axial direction as viewed in FIGURES 8 and 9. When the safety coupling 100 is condition for normal torque transmitting operation as shown in FIGURE 9, the balls 120 by centrifugal action are forced against the retainer collar 121 and retained in the position shown in FIGURE 9. The splines 116 and 117 are provided with a predetermined amount of backlash so that when the driving coupling member 123 is in the engaged position, the balls 120 are unloaded in the ball grooves and only the splines 116 and 117 transmit torque from the hub 115 to the driving coupling member 123 as best shown in FIGURE 11 with the direction of rotation of these members being shown by the arrows. When a predetermined reverse torque occurs, the driving coupling member 123 is moved by the resulting force interaction between the ramps of coupling teeth 151 and 152 from its engaged position shown in FIGURE 9 towards its disengaged position shown in FIGURE 8. As the driving coupling member 123 moves rightwardly the balls 120 move out of their unloaded condition and are caused to engage at diametrically opposite sides, the load side 155 of groove 119 which extends radially inwardly beyond the nonload side 156 of groove 119, and the load side 158 of groove 118 which extends radially outward beyond the nonload side 159 of groove 118 whereby there occurs slight relative rotation between the coupling member 123 and the hub 115 and disengagement of the splines 116 and 117. The balls 120 and grooves 118 and 119 thus carry the reverse torque load acting on the driving member 123 and permit free rolling action by the ball spline connection since the straight splines 116 and 117 are out of engagement. As the coupling teeth 151 and 152 separate and the coupling control member 131 is moved to the right towards its disengaged position, the coupling springs 144 are deflected and the ramps of teeth 164, like ramps 66, are brought into initial engagement with the bases of the ramped end faces of teeth 169, like ramped end faces 73, which have been brought into this position of engagement by the slipping action of the clutch 172 which is limited at this time since the coupling teeth 151 and 152 are not yet completely parted. As teeth 164 begin to climb the ramped end faces of teeth 169, the driving coupling member 123 is urged towards its disengaged position by this stepped tooth connection and the coupling teeth 151 and 152 are completely parted to fully uncouple the driving coupling member 123 from the driven coupling member 126. Subsequent movement of the coupling control member's teeth 164 up the ramped end faces of teeth 169 by the slipping action of the clutch which is now conditioned for maximum slip since the coupling teeth 151 and 152 are completely parted bring the stops of teeth 164, like stops 68, into engagement with the teeth 169 and movement of the driving coupling member 123 into its disengaged position. Under these conditions the coupling members 123 and 126 can rotate in the same direction and at different speeds with slipping action occurring in the clutch.

The ramp angle of the ramps of teeth 164 and ramped end faces of teeth 169 is selected so that only when the shaft 111 approaches the speed of shaft 114 or conversely, when the speed of shaft 114 approaches the speed of shaft 111 and the dynamic inertia torque acting on drum 174 is relieved, the small spring load of the coupling springs 144 is effective to urge the teeth 164 to return down the ramped end faces of teeth 169. Then as the ramps of the teeth 164 begin to leave the ramped end faces of teeth 169, the driving coupling member's teeth 151 begin to reengage the driven coupling member's teeth 152. When the ramps of teeth 164 have left the ramped end faces of teeth 169, the coupling springs 144 are then permitted to return the driving coupling member 123 to its engaged position and the coupling teeth 151 and 152 into full engagement without ratcheting.

To insure that the coupling member's teeth 151 and 152 fully reengage, particularly in the event the coupling is disengaged at shutdown, there is provided a predetermined backlash in the spline connection 128 connecting the driven coupling member 126 to the shaft 114. The backlash permits limited relative rotation between the driven coupling member 126 and shaft 114 and thus between the teeth 164 and 169 and between the coupling teeth 151 and 152 whereby reengagement by the coupling springs 144 is insured.

Like the embodiment shown in FIGURE 1, the parting force required to part the coupling member's teeth 151 and 152 is selected so that the starter torque of the starter connected to the shaft 114 will not uncouple the safety coupling 100.

The safety coupling of this invention which is illustrated as being adapted to couple a variable pitch propeller and an engine starter to a gas turbine engine will be readily understood as being adaptable to other applications having other prime movers and other loads.

The above-described preferred embodiments are illustrative of the invention which it will be appreciated may be modified within the scope of the appended claims.

I claim:

1. In a safety coupling the combination of
   (a) rotatable driving means and rotatable driven means having coupling means operable when engaged to couple said driving means to said driven means for conjoint rotation and to provide a torque path for torque transmittal and when disengaged to uncouple said driving means from said driven means to interrupt said torque path,
   (b) load means normally holding said coupling means in engagement and resisting disengagement of said coupling means,
   (c) said coupling means being responsive to a predetermined reverse torque to provide a disengaging force effective to overcome said load means to initiate coupling disengagement,
   (d) and coupling control means operable to complete actual coupling disengagement only after predetermined partial coupling disengagement and to hold said coupling means out of engagement until said predetermined reverse torque is relieved and permit reengagement of said coupling means by said load means only when the speeds of said driven means and said driving means are synchronzied.

2. In a safety coupling the combination of
   (a) rotatable driving means and rotatable driven means having coupling means operable when engaged to couple said driving means to said driven means for conjoint rotation and to provide a torque path for torque transmittal and when disengaged to uncouple said driving means from said driven means to interrupt said torque path,
   (b) variable load means normally holding said coupling means in engagement with one load and resisting disengagement of said coupling means with a load which decreases from said one load during disengagement of said coupling means,
   (c) said coupling means being operable to provide a disengaging force effective to overcome said one load to partially disengage said coupling means and permit relative rotation between said driving means and said driven means when a predetermined reverse torque occurs,
   (d) and coupling control means operable to complete disengagement of said coupling means against the decreasing load of said variable load means in response to initial relative rotation between said driving means and said driven means, and to hold said coupling means out of engagement against another load provided by said variable load means smaller than said one load until said predetermined reverse torque is relieved and said driven means approaches the speed of said driving means whereupon said coupling control means in response to said another load conditions said coupling means for reengagement by said one load.

3. The safety coupling set forth in claim 2 and said coupling means including means responsive to said predetermined reverse torque to partially disengage.

4. In a safety coupling the combination of
   (a) rotatable driving means and rotatable driven means having stepped coupling teeth operable when engaged to couple said driving means to said driven means for conjoint rotation and to provide a torque path for torque transmittal and when disengaged to uncouple said driving means from said driven means to interrupt said torque path,
   (b) variable load means normally holding said stepped coupling teeth in engagement with a large load and resisting disengagement of said stepped coupling teeth with a load which decreases from said large load during disengagement of said stepped coupling teeth,
   (c) said stepped coupling teeth being responsive to a predetermined reverse torque to provide a disengaging force effective to overcome said large load and partially disengage said stepped coupling teeth to permit relative rotation between said driving means and said driven means,
   (d) and coupling control means operable to complete disengagement of said stepped coupling teeth when said stepped coupling teeth are partially disengaged against the decreasing load of said variable load means in response to initial relative rotation between said driving means and said driven means, and to hold said stepped coupling teeth out of engagement against a small load provided by said variable load means until said predetermined reverse torque is relieved and said driven means approaches the speed of said driving means whereupon said coupling control means in response to said small load conditions said stepped coupling teeth for reengagement by said large load and permits reengagement of said stepped coupling teeth by said large load only when the speeds of said driving means and said driven means are synchronized to provide smooth reengagement of said stepped coupling teeth.

5. In a safety coupling the combination of
   (a) a rotatable driving coupling member capable of axial movement,
   (b) a rotatable driven coupling member adjacent to and coaxial with said driving coupling member,
   (c) coupling teeth on said driving coupling member and said driven coupling member having steps and ramps which fully engage upon movement of said driving coupling member in one axial direction to an engaged position whereby the engaged steps are conditioned to provide a torque path for torque transmittal to rotate said driven coupling member in the same direction and conjointly with said driving coupling member,
   (d) coupling spring means having a variable load-deflection characteristic operatively engaging said driving coupling member and deflected to hold said driving coupling member in said engaged position and said ramps and stops of said coupling teeth in engagement under one spring load, said coupling spring means being deflectable to permit movement of said driving coupling member in the opposite axial direction to a disengaged position where said coupling teeth are completely parted to permit relative rotation between said driving coupling member and said driven coupling member, said coupling spring means upon being deflected during movement of said driving coupling member from said engaged position to said disengaged position providing a decreasing spring load with increasing deflection and when said driving coupling member is in said disengaged position providing a second spring load smaller than said one spring load,
   (e) said ramps of said coupling teeth having a ramp angle selected so that said ramps in response to a predetermined reverse torque exert a parting force which exceeds said one spring load and moves said driving coupling member from said engaged position towards said disengaged position and parts said coupling teeth,
   (f) a coupling control member rigidly secured to said driving coupling member,
   (g) a coupling control clutch operatively connected to said driven coupling member and having clutch apply means, clutch spring means prestressed to urge said clutch apply means to apply said coupling control clutch to clutch said clutch apply means to said driven coupling member, (h) said coupling control member and said clutch apply means having ramped teeth constantly in mesh, (i) said ramped teeth of said clutch apply means having ramped end faces and said ramped teeth of said coupling control member being stepped to provide ramped portions and stop faces at the bases of said ramp portions so that as said coupling control member is moved in the opposite axial direction by said driving coupling member, said coupling control clutch brings said ramped end faces into initial engagement with said ramped portions whereupon said ramped portions are caused to climb said ramped end faces, said driving coupling member being moved to completely part said coupling teeth by said coupling control member as said ramped portions begin to climb said ramped end faces, said coupling control clutch permitting relative rotation between said driving coupling member and said driven coupling member when said coupling teeth are completely parted, said ramp portions continuing to climb said ramped end faces until said stop faces engage said ramped teeth of said clutch apply means which corresponds to movement of said driving coupling member into said disengaged position, (j) and the ramp angle of said ramped end faces and said ramped portions being selected so that upon said predetermined reverse torque being relieved and said driven coupling member approaching the speed of said driving coupling member, said second spring load urges said ramped portions to climb back down said ramped end faces, and upon said ramped portions beginning to leave said ramped end faces said ramped teeth permitting said coupling teeth to start reengaging and upon said ramped portions leaving said ramped end faces said ramped teeth permitting said coupling spring means to urge said driving coupling member to said engaged position with said one spring load whereby said coupling teeth smoothly and fully reengage.

6. In a safety coupling the combination of
(a) a rotatable driving coupling member capable of axial rovement,
(b) a rotatable driven coupling member adjacent to and coaxial with said driving coupling member,
(c) coupling teeth on said driving coupling member and said driven coupling member having steps and ramps which engage upon movement of said driving coupling member in one axial direction to an engaged position whereby the engaged steps are conditioned to provide a torque path for torque transmittal to rotate said driven coupling member in the same direction and conjointly with said driving coupling member,
(d) coupling spring means operatively engaging said driving coupling member and prestressed to hold said driving coupling member in said engaged position and said ramps and stops of said coupling teeth in engagement under one spring load, said coupling spring means permitting movement of said driving coupling member in the opposite axial direction to a disengaged position where said coupling teeth are completely parted to permit relative rotation between said driving coupling member and said driven coupling member, said coupling spring means providing a second spring load smaller than said one spring load urging said driving coupling member to return from said disengaged position to said engaged position,
(e) said ramps of said coupling teeth having a ramp angle selected so that said ramps in response to a predetermined reverse torque exert a parting force which exceeds said one spring load and moves said driving coupling member from said engaged position towards said disengaged position and parts said coupling teeth, (f) a coupling control member rigidly secured to said driving coupling member,
(g) a coupling control clutch, clutch means, said coupling control clutch being operable to clutch said driven coupling member to said clutch means,
(h) said coupling control member and said clutch means having ramped teeth constantly in mesh,
(i) said ramped teeth of said clutch means having ramped end faces and said ramped teeth of said coupling control member being stepped to provide ramped portions and stop faces at the bases of said ramped portions so that as said coupling control member is moved in the opposite axial direction by said driving coupling member said coupling control clutch brings said ramped end faces into initial engagement with said ramped portions whereupon said ramped portions are caused to climb said ramped end faces, said driving coupling member being moved to completely part said coupling teeth by said coupling control member as said ramped portions begin to climb said ramped end faces, said coupling control clutch permitting relative rotation between said driving coupling member and said driven coupling member when said coupling teeth are completely parted, said ramp portions continuing to climb said ramped end faces until said stop faces engage said ramped teeth of said clutch apply means which corresponds to movement of said driving coupling member into said disengaged position,
(j) and the ramp angle of said ramped end faces and said ramped portions being selected so that upon said predetermined reverse torque being relieved and said driven coupling member approaching the speed of said driving coupling member, said second spring load urges said ramped portions to climb back down said ramped end faces, and upon said ramped portions beginning to leave said ramped end faces said ramped teeth permitting said coupling teeth to start reengaging, and upon said ramped portions leaving said ramped end faces said ramped teeth permitting said coupling spring means to urge said driving coupling member to said engaged position with said one spring load whereby said coupling teeth smoothly and fully reengage.

7. The safety coupling set forth in claim 6 and said coupling spring means being Belleville type diaphragm springs.

8. The safety coupling set forth in claim 6 and a driven member, drive connection means drivingly connecting said driven coupling member to said driven member and permitting limited relative rotation between said driven coupling member and said driven member to insure reengagement of said coupling teeth by said coupling spring means when said driving coupling member and said driven coupling member are not rotating.

9. In a safety coupling the combination of
(a) a rotatable driving member, a driving coupling member, said driving member and said driving coupling member having engageable straight splines permitting axial movement of said driving coupling member relative to said driving member between an engaged position and a disengaged position, said straight splines being normally engaged when said driving coupling member is in said engaged position to provide a splined drive connection connecting said driving member to said driving coupling member, said driving member and said driving coupling member having mating straight ball grooves providing straight ball races, a ball mounted in each of said ball races normally unloaded when said driving coupling member is in said engaged position and being loaded as said driving coupling member is moved between said engaged position and said disengaged position to provide a ball groove drive connection connecting said driving member to said driving coupling member and to effect disengagement of said splined drive connection, (b) a rotatable driven coupling member adjacent to and coaxial with said driving coupling member, (c) corresponding buttress type coupling teeth on said driving coupling member and said driven coupling member having steps and ramps which fully engage upon movement of said driving coupling member in one axial direction to said engaged position whereby said splined drive connection connects said driving member to said driving coupling member and the engaged steps are conditioned to provide a torque path for torque transmittal to rotate said driven coupling member in the same direction and conjointly with said driving coupling member, (d) coupling spring means having a variable-load deflection characteristic operatively engaging said driving coupling member and deflected to hold said driving coupling member in said engaged position and said ramps and stops of said buttress type coupling teeth in engagement under a large spring load, said coupling spring means being deflectable to permit movement of said driving coupling member by said ball groove drive connection in the opposite axial direction to said disengaged position where said buttress type coupling teeth are completely parted to permit relative rotation between said driving coupling member and said driven coupling member, said coupling spring means upon being deflected during movement of said driving coupling member from said engaged position to said disengaged position providing a decreasing spring load with increasing deflection and when said driving coupling member is in said disengaged position providing a small spring load, (e) said ramps of said buttress type coupling teeth having a ramp angle selected so that said ramps in response to a predetermined reverse torque exert a parting force which exceeds said large spring load and moves said driving coupling member from said engaged position towards said disengaged position and parts said buttress type coupling teeth whereby there occurs initial relative rotation between said driving coupling member and said driven coupling member, (f) a coupling control member rigidly secured to said driving coupling member, (g) a coupling control clutch operatively connected to said driven coupling member and having clutch apply means, clutch spring means prestressed to urge said clutch apply means to apply said coupling control clutch with a small clutch load to clutch said clutch apply means to said driven coupling member, (h) said coupling control member and said clutch apply means having ramped teeth constantly in mesh, (i) said ramped teeth of said clutch apply means having ramped end faces and said ramped teeth of said coupling control member being stepped to provide ramped portions and stop faces at the bases of said ramp portions so that as said coupling control member is moved in the opposite axial direction by said driving coupling member and there occurs initial rotation between said driving coupling member and said driven coupling member as a result of said buttress type coupling teeth parting in response to said predetermined reverse torque, said coupling control clutch brings said ramped end faces into initial engagement with said ramped portions whereupon said ramped portions are caused to climb said ramped end faces, said outer rim being moved to completely part said buttress type coupling teeth by said coupling control member as said ramped portions begin to climb said ramped end faces, said coupling control clutch permitting relative rotation between said driving coupling member and said driven coupling member when said buttress type coupling teeth are completely parted, said ramp portions continuing to climb said ramped end faces until said stop faces engage said ramped teeth of said clutch apply means which corresponds to movement of said driving coupling member into said disengaged position, (j) and the ramp angle of said ramped end faces and said ramped portions being selected so that upon said predetermined reverse torque being relieved and said driven coupling member approaching the speed of said driving coupling member, said low spring load of said coupling spring means urges said ramped portions to climb back down said ramped end faces, and upon said ramped portions beginning to leave said ramped end faces said ramped teeth permitting said buttress type coupling teeth to start reengaging and upon said ramped portions leaving said ramped end faces said ramped teeth permitting said coupling spring means to urge said driving coupling member to said engaged position with said large spring load whereby said buttress type coupling teeth smoothly and fully reengage.

10. The safety coupling set forth in claim 9 and said coupling spring means being Belleville type diaphragm springs.

11. The safety coupling set forth in claim 9 and a driven shaft, said driven shaft and said driven coupling member having engaged straight splines providing a splined drive connection connecting said driven coupling member to said driven shaft and permitting limited relative rotation between said driven coupling member and said driven shaft to insure reengagement of said buttress type coupling teeth by said coupling spring means when said driving coupling member and said driven coupling member are not rotating.

12. The safety coupling set forth in claim 9 and said ball grooves being inclined to the axis of said driving coupling member and said driving member, said straight ball grooves in said driving coupling member each having a groove depth which increases with increasing groove length in said opposite axial direction and a load side for ball engagement which extends radially inwardly beyond a nonload side and said straight ball grooves in said driving member each having a groove depth which decreases with increasing groove length in said opposite axial direction and a load side for ball engagement which extends radially outwardly beyond a nonload side.

13. In a safety coupling the combination of (a) a rotatable driving coupling member having a center hub, an outer rim and a radially extending resilient web integral with said center hub and said outer rim, said web being capable of bending about said center hub to permit axial movement of said outer rim relative to said center hub, (b) a rotatable driven coupling member adjacent to and coaxial with said driving coupling member, (c) corresponding buttress type coupling teeth on said outer rim and said driven coupling member having steps and ramps which fully engage upon movement of said outer rim in one axial direction to an engaged position whereby the engaged steps are conditioned to provide a torque path for torque transmittal to rotate said driven coupling member in the same direction and conjointly with said driving coupling member, (d) coupling spring means having a variable load-deflection characteristic operatively engaging said outer rim and deflected to hold said outer rim in said engaged position and said ramps and stops of said buttress type coupling teeth in engagement under a large spring load, said coupling spring means being deflectable to permit movement of said outer rim in the opposite axial direction to a disengaged position where said buttress type coupling teeth are completely parted to permit relative rotation between said driving coupling member and said driven coupling member, said coupling spring means upon being deflected during movement of said outer rim from said engaged position to said disengaged position providing a decreasing spring load with increasing deflection and when said outer rim is in said disengaged position providing a small spring load, (e) said ramps of said buttress type coupling teeth having a ramp angle selected so that said ramps in response to a predetermined reverse torque exert a parting force which exceeds said large spring load and bends said web to move said outer rim from said engaged position towards said disengaged position and parts said buttress type coupling teeth whereby there occurs initial relative rotation between said driving coupling member and said driven coupling member, (f) a coupling control member rigidly secured to said outer rim, (g) a coupling control clutch operatively connected to said driven coupling member and having clutch apply means, clutch spring means prestressed to urge said clutch apply means to apply said coupling control clutch with a small clutch load to clutch said clutch apply means to said driven coupling member, (h) said coupling control member and said clutch apply means having ramped teeth constantly in mesh, (i) said ramped teeth of said clutch apply means having ramped end faces and said ramped teeth of said coupling control member being stepped to provide ramped portions and stop faces at the bases of said ramp portions so that as said coupling control member is moved in the opposite axial direction by said outer rim and there occurs initial rotation between said driving coupling member and said driven coupling member as a result of said buttress type coupling teeth parting in response to said predetermined reverse torque, said coupling control clutch brings said ramped end faces into initial engagement with said ramped portions whereupon said ramped portions are caused to climp said ramped end faces, said outer rim being moved to completely part said buttress type coupling teeth by said coupling control member as said ramped portions begin to climb said ramped end faces, said coupling control clutch permitting relative rotation between said driving coupling member and said driven coupling member when said buttress type coupling teeth are completely parted, said ramp portions continuing to climb said ramped end faces until said stop faces engage said ramped teeth of said clutch apply means which corresponds to movement of said outer rim into said disengaged position, (j) and the ramp angle of said ramped end faces and said ramped portions being selected so that upon said predetermined reverse torque being relieved and said driven coupling member approaching the speed of said driving coupling member, said low spring load of said coupling spring means urges said ramped portions to climb back down said ramped end faces, and upon said ramped portions beginning to leave said ramped end faces said ramped teeth permitting said buttress type coupling teeth to start reengaging and upon said ramped portions leaving said ramped end faces said ramped teeth permitting said coupling spring means to urge said outer rim to said engaged position with said large spring load whereby said buttress type coupling teeth smoothly and fully reengage.

14. The safety coupling set forth in claim 13 and said coupling spring means being Belleville type diaphragm springs.

15. The safety coupling set forth in claim 13 and a driven shaft, said driven coupling member having engaged straight splines providing a splined drive connection connecting said driven coupling member to said driven shaft and permitting limited relative rotation between said driven coupling member and said driven shaft to insure reengagement of said buttress type coupling teeth by said coupling spring means when said driving coupling member and said driven coupling member are not rotating.

References Cited by the Examiner

UNITED STATES PATENTS

| 2,699,855 | 1/1955 | Barlow et al. | |
| 2,976,974 | 3/1961 | Blyth | 192—54 |
| 3,090,242 | 5/1963 | Sabatini | 192—41 |

FOREIGN PATENTS 652,502   11/1962   Canada.

DAVID J. WILLIAMOWSKY, *Primary Examiner.*